US012756091B2

(12) United States Patent
Yoo et al.

(10) Patent No.: US 12,756,091 B2
(45) Date of Patent: Oct. 6, 2026

(54) ANTENNA AND ELECTRONIC DEVICE INCLUDING THE SAME

(71) Applicant: Samsung Electronics Co., Ltd., Suwon-si (KR)

(72) Inventors: Jangsun Yoo, Suwon-si (KR); Kyungjae Kim, Suwon-si (KR); Minseok Kim, Suwon-si (KR); Junghwan Park, Suwon-si (KR); Yongjoo Shin, Suwon-si (KR); Myeonggil Lee, Suwon-si (KR); Gwanghyun Jo, Suwon-si (KR); Gun Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 454 days.

(21) Appl. No.: 18/120,921

(22) Filed: Mar. 13, 2023

(65) Prior Publication Data

US 2023/0216187 A1 Jul. 6, 2023

Related U.S. Application Data

(63) Continuation of application No. PCT/KR2022/015359, filed on Oct. 12, 2022.

(30) Foreign Application Priority Data

Oct. 13, 2021 (KR) ........................ 10-2021-0135743

(51) Int. Cl.
*H01Q 1/48* (2006.01)
*H01Q 1/22* (2006.01)
(Continued)

(52) U.S. Cl.
CPC ............. *H01Q 1/48* (2013.01); *H01Q 1/2266* (2013.01); *H01Q 5/307* (2015.01); *H01Q 9/0457* (2013.01)

(58) Field of Classification Search
CPC ........ H01Q 1/48; H01Q 1/2266; H01Q 5/307; H01Q 9/0457; H01Q 1/243
See application file for complete search history.

(56) References Cited

U.S. PATENT DOCUMENTS 6,441,791 B1 * 8/2002 Oka ......................... H01Q 9/38 343/846
8,948,827 B2 2/2015 Wei et al.
(Continued)

FOREIGN PATENT DOCUMENTS

CN 206947518 U 1/2018
CN 108270076 A 7/2018
(Continued)

OTHER PUBLICATIONS

Extended European Search Report Issued In EP Application No. 22881331.7-1201, Mail Date Sep. 30, 2024, 8 Pages.
(Continued)

*Primary Examiner* — Dieu Hien T Duong
(74) *Attorney, Agent, or Firm* — CANTOR COLBURN LLP

(57) ABSTRACT

According to an embodiment, an electronic device includes a housing including a first surface and a second surface opposite to the first surface, and an antenna including a printed circuit board (PCB) positioned between the first surface and the second surface. The PCB includes a feed pattern including a first connector region, and a ground pattern including a first ground region in contact with a first portion of the first surface, a first coupling region connected to the first ground region, a second ground region connected to the first coupling region and including a second connector region, and a second coupling region connected to the second ground region and in contact with a second portion different from the first portion of the first surface.

23 Claims, 11 Drawing Sheets

(51) Int. Cl.
*H01Q 5/307* (2015.01)
*H01Q 9/04* (2006.01)

(56) References Cited

U.S. PATENT DOCUMENTS

| | | | | |
|---|---|---|---|---|
| 9,640,868 | B2 | 5/2017 | Peng et al. | |
| 9,812,770 | B2 | 11/2017 | Gavilan et al. | |
| 10,096,889 | B2 | 10/2018 | Yang | |
| 10,511,079 | B2 | 12/2019 | Wu et al. | |
| 10,594,022 | B2 | 3/2020 | Oh et al. | |
| 2009/0021448 | A1 | 1/2009 | Tsai et al. | |
| 2015/0123874 | A1 | 5/2015 | Chan et al. | |
| 2019/0036223 | A1 | 1/2019 | Wu et al. | |
| 2019/0123423 | A1 | 4/2019 | Wu et al. | |
| 2019/0334254 | A1* | 10/2019 | Wu | H01Q 1/521 |
| 2020/0185831 | A1 | 6/2020 | Chen et al. | |
| 2020/0235461 | A1 | 7/2020 | Hirota et al. | |

FOREIGN PATENT DOCUMENTS

| | | | | |
|---|---|---|---|---|
| CN | 208589979 | U | * | 3/2019 |
| KR | 20210015563 | A | | 2/2021 |
| KR | 20210054262 | A | | 5/2021 |
| KR | 20220040938 | A | | 3/2022 |

OTHER PUBLICATIONS

International Search Report issued in International Application No. PCT/KR2022/015359; Application Filing Date Oct. 12, 2022; Date of Mailing Jan. 19, 2023 (3 pages).

Korean Office Action Issued In KR Application No. 10-2021-0135743; Mail Date Oct. 13, 2025; 6 Pages.

* cited by examiner

ANTENNA AND ELECTRONIC DEVICE INCLUDING THE SAME

CROSS-REFERENCE TO RELATED APPLICATIONS

This application is a continuation of International Application No. PCT/KR2022/015359 designating the United States, filed on Oct. 12, 2022, in the Korean Intellectual Property Receiving Office and claiming priority to Korean Patent Application 10-2021-0135743, filed on Oct. 13, 2021, at the Korean Intellectual Property Office, the disclosures of which are incorporated by reference herein in their entireties.

BACKGROUND

1. Field

The disclosure relates to an antenna and an electronic device including the same.

2. Description of Related Art

The use of electronic devices having wireless communication functions, such as data communication (e.g., the Internet), has increased. Various technologies to utilize a next-generation network (e.g., fifth-generation new radio (5G NR)) have been developed to provide a high-speed mobile communication function to a user.

SUMMARY

An aspect of the disclosure include an antenna for covering an entire frequency band of a next-generation network and an electronic device including the same.

According to an embodiment, an electronic device includes a housing including a first surface and a second surface opposite to the first surface, and an antenna including a printed circuit board (PCB) positioned between the first surface and the second surface, wherein the PCB includes a feed pattern including a first connector region, and a ground pattern including a first ground region in contact with a first portion of the first surface, a first coupling region connected to the first ground region, a second ground region connected to the first coupling region and including a second connector region, and a second coupling region connected to the second ground region and in contact with a second portion different from the first portion of the first surface.

According to an embodiment, an antenna includes a feed pattern including a first connector region, and a ground pattern including a first ground region, a first coupling region connected to the first ground region, a second ground region connected to the first coupling region and including a second connector region, and a second coupling region connected to the second ground region.

According to an embodiment, an electronic device includes a housing including a first surface including a first part of a non-metal material and a second part of metal material formed of a single segment, and a second surface opposite to the first surface, and an antenna including a PCB positioned between the first surface and the second surface, wherein the PCB includes a feed pattern positioned on the first part, and a ground pattern including a first ground region in contact with a first portion of the first surface, a first coupling region connected to the first ground region, a second ground region connected to the first coupling region and including a second connector region, and a second coupling region connected to the second ground region and in contact with a second portion different from the first portion of the first surface.

According to an embodiment, each frequency band of a next-generation network (e.g., a fifth-generation (5G) network) may have a bandwidth that may be expanded. According to an embodiment, radio waves in an entire frequency band (e.g., a range of about 600 megahertz (MHz) to about 4,300 MHz) of the next-generation network may be transmitted and received using a single antenna without additional antennas. According to an embodiment, a broadband antenna may be designed in an electronic device in a standardized port structure having limited transmission power without additional components (e.g., a radio frequency (RF) circuit element). According to an embodiment, the radiation efficiency of radio waves may be improved. The effects of an antenna and an electronic device including the same according to an embodiment may not be limited to the above-mentioned effects, and other unmentioned effects may be clearly understood from the following description by one of ordinary skill in the art.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
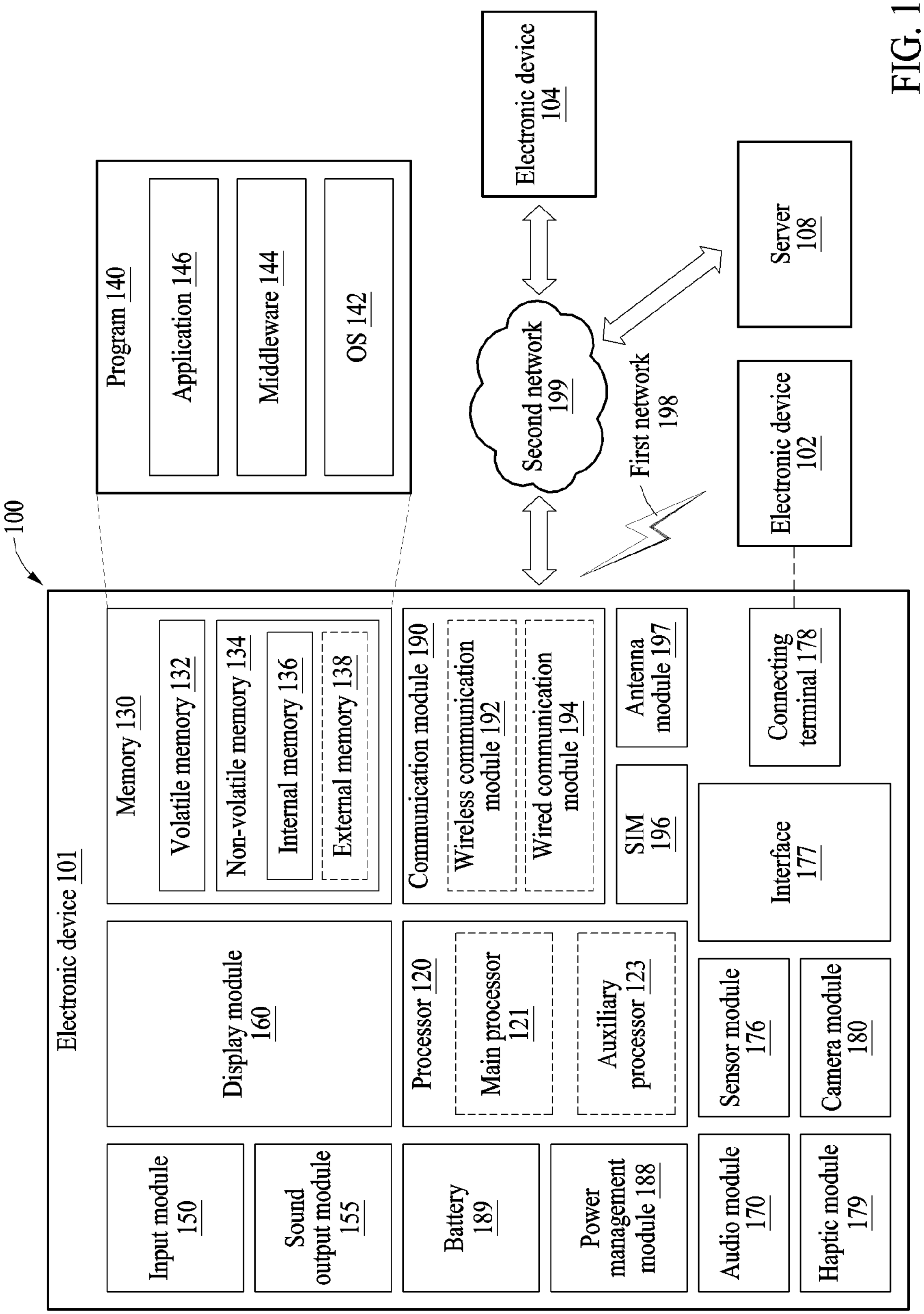
FIG. 1 is a block diagram illustrating an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module

170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing audio. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an embodiment, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that an embodiment of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
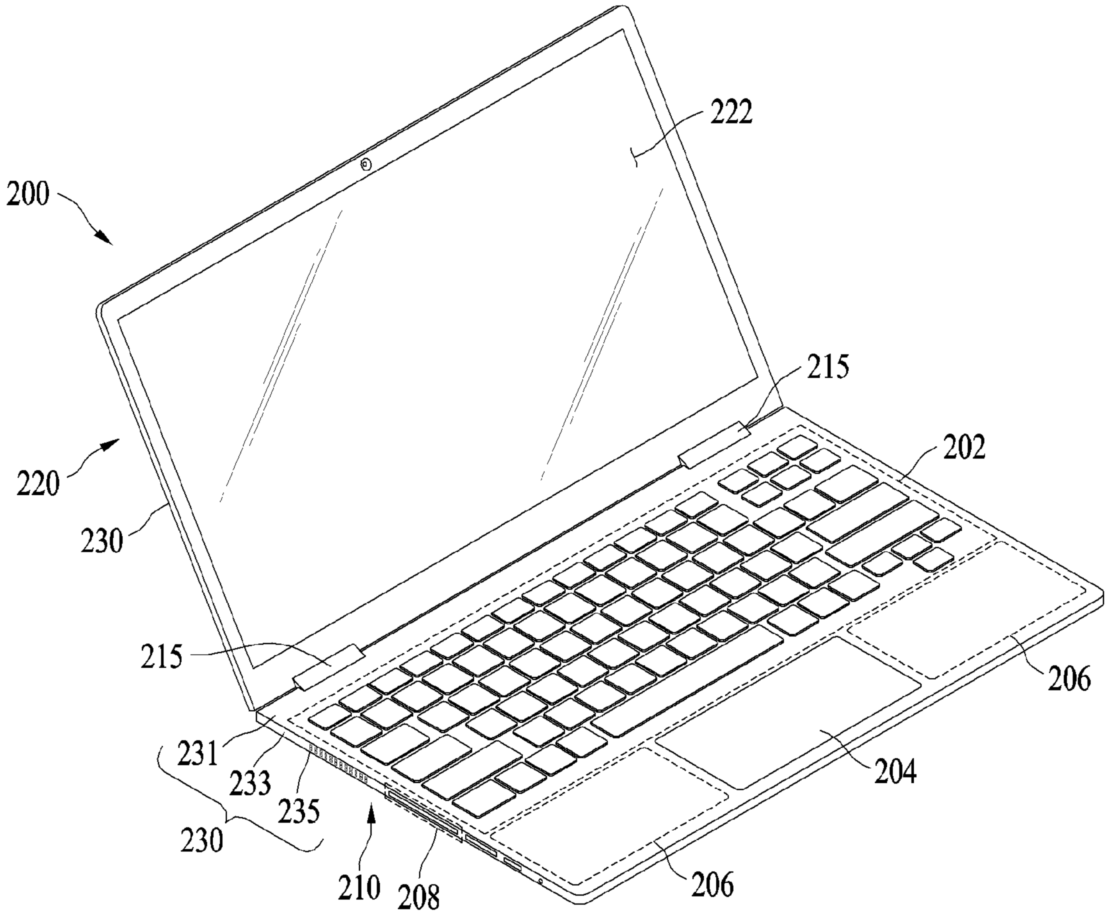
FIG. 2 is a perspective view of an electronic device according to an embodiment.

Referring to FIG. 2, an electronic device 200 (e.g., the electronic device 101 of FIG. 1) may include a first housing 210, a connector 215, a display 220 (e.g., the display module 160 of FIG. 1), and a second housing 230. The electronic device 200 may include, for example, a smartphone, a laptop computer, a tablet personal computer (PC), an e-book reader, a portable multimedia device, a portable medical device, a wearable device, or a home appliance.

The first housing 210 may include a keyboard 202, a touchpad 204, a palm rest 206, and an antenna module 208.

The keyboard 202 (e.g., the input device 150 of FIG. 1) may include a plurality of keys on an upper portion of the first housing 210. The keyboard 202 may receive numeric or character information. The keyboard 202 may include a plurality of input keys and function keys for setting various functions of the electronic device 200. The function keys may include an arrow key, a volume key, and/or a shortcut key set to perform a designated function. The keyboard 202 may include one of a qwerty keypad, a 3*4 keypad, a 4*3 keypad, or a touch key. The touchpad 204 may replace a function of a mouse. The touchpad 204 may input a command to select or execute an application displayed on the display 220. The palm rest 206 may be a pedestal for reducing wrist fatigue of a user of the electronic device 200 when the user is using the keyboard 202. The antenna module 208 (e.g., the antenna module 197 of FIG. 1) may transmit or receive a signal or power to or from an external electronic device (e.g., the electronic device 102 and 104, and/or the server 108 of FIG. 1).

The connector 215 may foldably or unfoldably couple the first housing 210 to the display 220. The connector 215 may mechanically connect the first housing 210 and the display 220. The connector 215 may include, for example, a hinge member between the first housing 210 and the display 220. The connector 215 may electrically connect the first housing 210 and the display 220. The connector 215 may include, for example, a flexible printed circuit board (FPCB) between the first housing 210 and the display 220.

The display 220 may include a screen 222. The screen 222 may display information input by the user and information to be provided to the user using various menus and the keyboard 202 of the electronic device 200. The screen 222 may be formed of at least one of a liquid crystal display (LCD), an organic light-emitting diode (OLED), an active-matrix organic light-emitting diode (AMOLED), a flexible display, or a transparent display. The screen 222 may provide at least one of various screens, such as a home screen, a menu screen, a lock screen, a game screen, a webpage screen, a call screen, or a music or video playback screen according to the use of the portable electronic device 200.

The second housing 230 may form an exterior of the first housing 210. The second housing 230 may also be applied to the palm rest 206 positioned in the first housing 210. The second housing 230 may protect at least one electronic component (e.g., the processor 120, the memory 130, the sensor module 176 of FIG. 1, and other electronic components) included in the first housing 210. The second housing 230 may include a first surface 231 covering the upper surface, a second surface 233 covering a side surface, and a third surface 235 covering a rear surface of the first housing 210. The second housing 230 may form an exterior of the display 220. The second housing 230 may protect at least one of various electronic components (e.g., the camera module 180, the sound output device 155 of FIG. 1, and other electronic components) and the screen 222 included in the display 220.

Referring to FIGS. 3A to 3E, an electronic device 301 (e.g., the electronic device 101 of FIG. 1 and/or the electronic device 200 of FIG. 2) are shown, the electronic device includes a housing 310 (e.g., the first housing 210 of FIG. 2) including a first surface 310A (e.g., a front surface) and a second surface 310B (e.g., a rear surface) opposite to the first surface 310A. The housing 310 may include a keyboard 302 (e.g., the keyboard 202 of FIG. 2), a touchpad 304 (e.g., the touchpad 204 of FIG. 2), a sound output module 355 (e.g., the sound output module 155 of FIG. 1), and an antenna 397 (e.g., the antenna module 197 of FIG. 1 and/or the antenna module 208 of FIG. 2).

In an example embodiment, the housing 310 may include a first metal part 312, at least one first non-metal part 314, a second metal part 316, and at least one second non-metal part 318. The first metal part 312 and the at least one first non-metal part 314 may form the first surface 310A of the housing 310, and the second metal part 316 and the at least one second non-metal part 318 may form the second surface 310B of the housing 310. In an example embodiment, the first metal part 312 and the at least one first non-metal part 314 may be bonded to each other and processed such that substantially a segment line is not formed. For example, the first metal part 312 and the at least one first non-metal part 314 may be coupled by bonding or double injection, and may be color coated by applying a spraying or anodizing technique. In an example embodiment, the second metal part 316 and the at least one second non-metal part 318 may be bonded to each other and processed (e.g., anodized) such that substantially a segment line is not formed. In an example embodiment, at least one first non-metal part 314 and the at least one second non-metal part 318 may be formed of a plastic material.

In an example embodiment, the first metal part 312 may include a plurality of keyboard holes 313A formed on the first surface 310A and a plurality of edges 313B and 313C defining the plurality of keyboard holes 313A. The plurality of edges 313B and 313C may include an outer edge 313B forming an outermost portion of the plurality of keyboard holes 313A and inner edges 313C forming the keyboard holes 313A of which each size fits the shapes of keyboards from the outer edge 313B.

In an example embodiment, the first metal part 312 and/or the second metal part 316 may be formed of a substantially single segment. Here, being formed of "a single segment" means that a corresponding component may be formed as a complete part that is continuously connected without bonding, connecting, and/or coupling a plurality of segments and may be formed without a segment line, which may be generated by bonding, connecting, and/or coupling the plurality of segments.

Figure 3A:
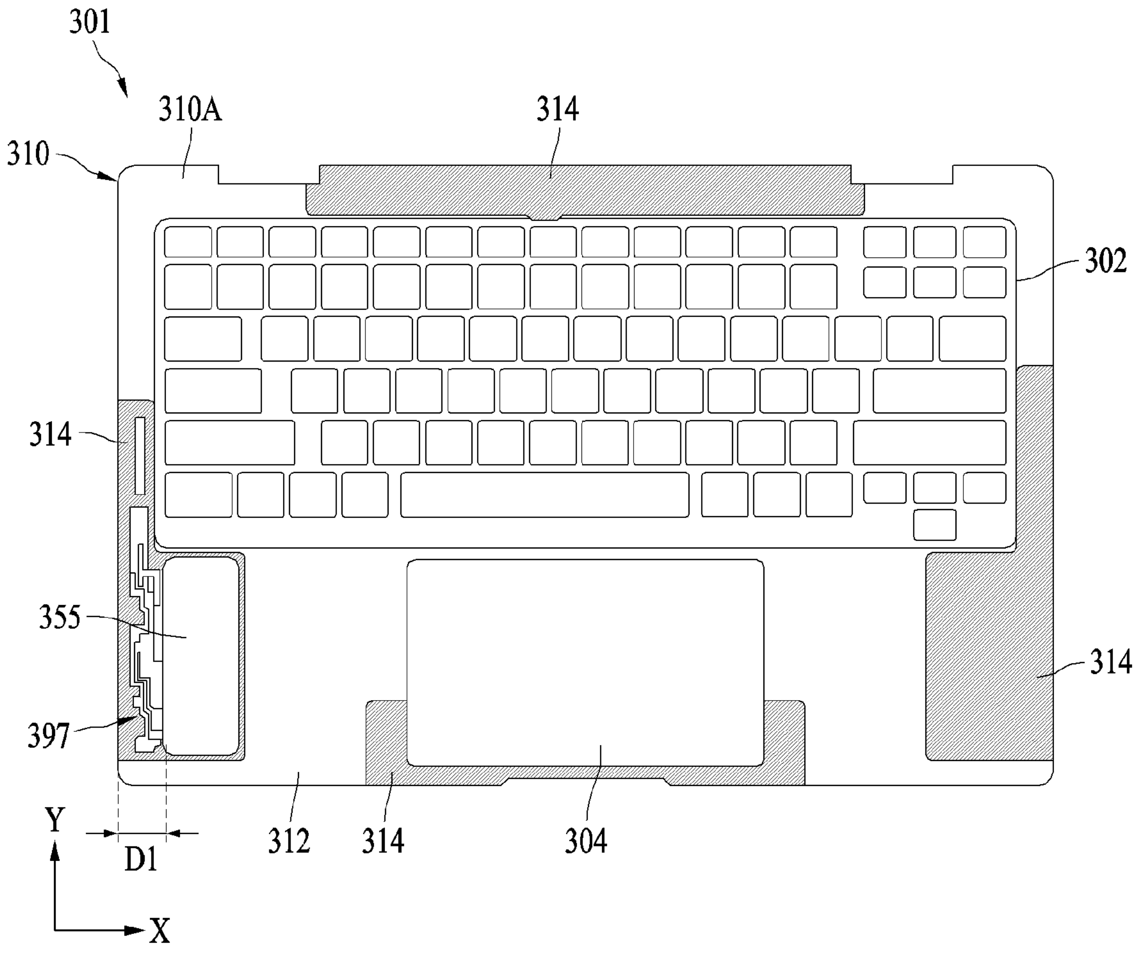
FIG. 3A is a diagram of an electronic device viewed in one direction according to an example embodiment.
Figure 3B:
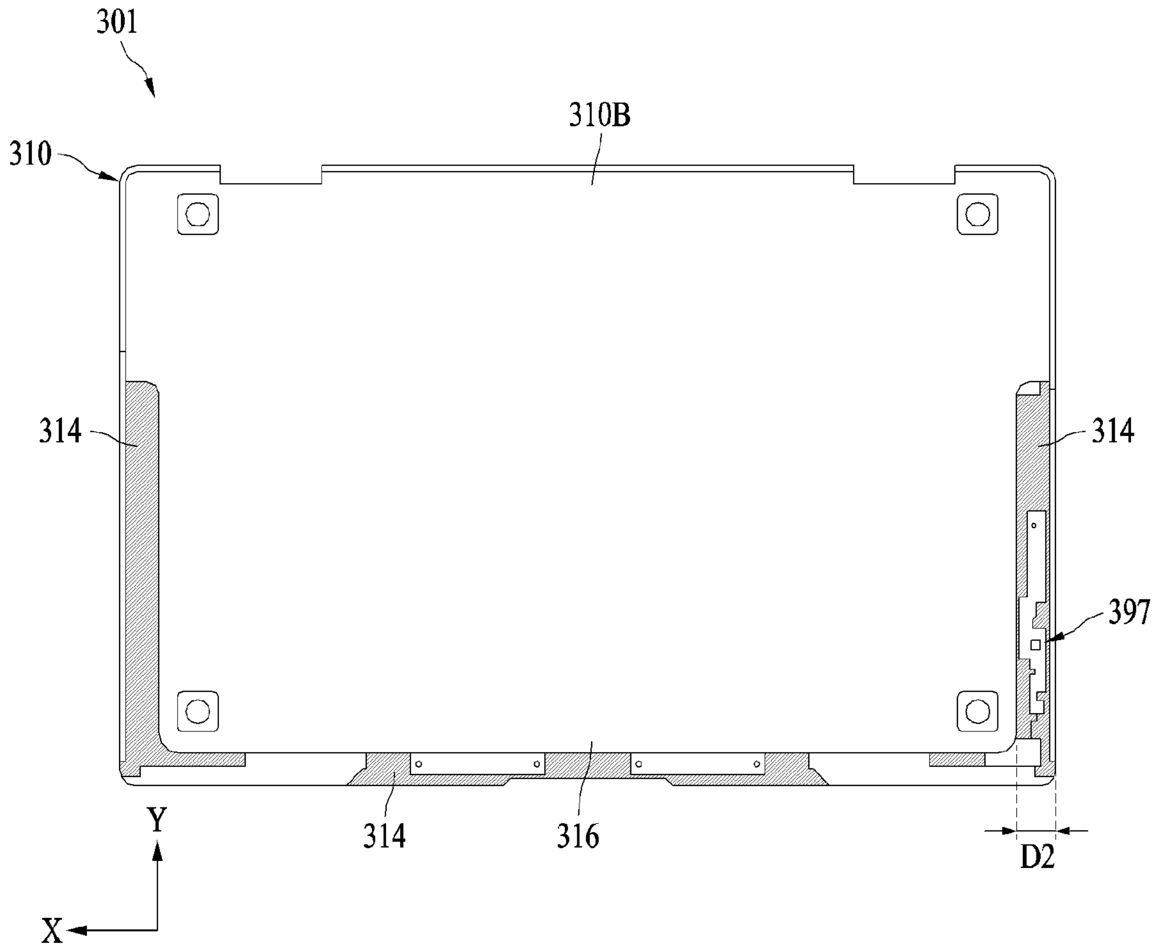
FIG. 3B is a diagram of an electronic device viewed in another direction according to an example embodiment.

In an example embodiment, the sound output module 355 may be positioned on a partial region of the antenna 397. For example, the sound output module 355 may not substantially overlap a region of a feed pattern 334 and may overlap at least a portion of a ground pattern 336. FIG. 3A illustrates that the at least one first non-metal part 314 in which the antenna 397 and the sound output module 355 are positioned may enclose the antenna 397 and the sound output module 355, however, unlike what is shown in the drawing, it may be understood that the at least one first non-metal part 314 may be positioned to substantially overlap the antenna 397 and the sound output module 355.

In an example embodiment, the first metal part 312 and the at least one first non-metal part 314 may at least partially define a radiation region of the antenna 397. The radiation region of the antenna 397 defined by the first metal part 312 and the at least one first non-metal part 314 may have a first width D1 when the housing 310 is viewed from the first surface 310A and may have a second width D2 when the housing 310 is viewed from the second surface 310B. In an example embodiment, the first width D1 may be defined as a distance between an edge of the first metal part 312 and/or an edge of the at least one first non-metal part 314 and the sound output module 355, and the second width D2 may be defined as a distance between edges of the second metal part 316 where the at least one second non-metal part 318 is visible. The first width D1 and the second width D2 may be, for example, about 10 millimeters (mm), but are not limited thereto, and may be designed in various dimensions based on a frequency or a wavelength of a radiated radio wave.

In an example embodiment, the electronic device 301 may include a keyboard support body 320 configured to support the keyboard 302. The keyboard support body 320 may be positioned on the plurality of keyboard holes 313A formed on the first surface 310A of the first metal part 312 and a plurality of edges 313B and 313C forming the plurality of keyboard holes 313A.

In an example embodiment, the electronic device 301 may include an insulator 322 that reduces or prevents electrical connection between electronic components (e.g., the processor 120, memory 130, sensor module 176 of FIG. 1 and/or other electronic components) in the first metal part 312 and the housing 310. The insulator 322 may be positioned on the keyboard support body 320.

In an example embodiment, the antenna 397 may include a printed circuit board (PCB) 330 and a cable 332 connecting the PCB 330 and a communication module (e.g., the communication module 190 of FIG. 1). The cable 332 may have a feed end and a ground end. In an example embodiment, the PCB 330 may be a flexible PCB.

The PCB 330 may include the feed pattern 334 and the ground pattern 336. In an example embodiment, the feed pattern 334 may be positioned at a center of the PCB 330, and the ground pattern 336 may be positioned in a periphery of the PCB 330. In an example embodiment, the feed pattern 334 may be positioned on the first non-metal part 314, at least a portion of the ground pattern 336 may be positioned on the first non-metal part 314, and a remaining portion of the ground pattern 336 may be positioned on the first metal part 312.

In an example embodiment, the feed pattern 334 may include a first feed portion 338A, a second feed portion 338B extending from the first feed portion 338A, and a third feed portion 338C extending from the first feed portion 338A in a direction different from an extending direction of the second feed portion 338B. For example, the first feed portion 338A may have a substantially polygonal shape (e.g., a quadrilateral shape), and the second feed portion 338B and the third feed portion 338C may have a conductive portion in one direction (e.g., a longitudinal direction in FIG. 3E) and a conductive portion in another direction (e.g., a lateral direction in FIG. 3E). Meanwhile, the feed pattern 334 described herein is an example, and not limited to the illustrated shape, and may have various shapes based on a position, type, and/or radiation pattern of the antenna 397.

In an example embodiment, the feed pattern 334 may include a first connector region 340 connected to the feed end of the cable 332 and positioned on the third feed portion 338C. In an example embodiment, the first connector region 340 may be positioned adjacent to at least one of the plurality of edges 313B and 313C defining the plurality of keyboard holes 313A. In some example embodiments, the first connector region 340 may be positioned adjacent to the outer edge 313B.

In an example embodiment, the ground pattern 336 may include a first ground region 342, a first coupling region 344, a second ground region 346, and a second coupling region 350. The first ground region 342 may be configured to contact a first portion P1 of the first metal part 312, and the second coupling region 350 may be configured to contact a second portion P2 of the second metal part 316. In an example embodiment, the first portion P1 and the second portion P2 may be different portions in the first metal part 312. The antenna 397 may include the first ground region 342 contacting different portions P1 and P2 of the first metal part 312 and the second coupling region 350 to form almost the entire region of the housing 310 including the first non-metal part 314 in a radiation structure of the antenna 397, thereby expanding a bandwidth of a frequency band (e.g., about 600 to 1,000 MHz low-band, about 1,700 to 2,300 MHz mid-band, about 2,300 to 2,700 MHz high-band, and/or about 3,300 to 4,300 MHz ultra-high-band) of a next-generation network (e.g., a 5G network).

The first coupling region 344 may be positioned between the first ground region 342 and the second ground region 346 and may connect the first ground region 342 to the second ground region 346. In an example embodiment, the first coupling region 344 may be positioned to at least partially enclose the feed pattern 334. For example, the first coupling region 344 may form an open loop or a closed loop.

In an example embodiment, the first coupling region 344 may include a first periphery 344A positioned in a first side (e.g., a lower side in FIG. 3E) of the feed pattern 334, a second periphery 344B positioned in a second side (e.g., an upper side in FIG. 3E) opposite to the first side of the feed pattern 334, and a third periphery 344C positioned in a third side (e.g., a right side in FIG. 3E) between the first side and the second side of the feed pattern 334 and connecting the first periphery 344A to the second periphery 344B. The first periphery 344A and the second periphery 344B may be electrically connected to a mechanical component (e.g., the housing 310) of the electronic device 301, and a radiation current may flow through the component. In some example embodiments, an open portion (e.g., a left side in FIG. 3E) of the first coupling region 344 in which a periphery is not formed may be a portion facing a component (e.g., the keyboard 302) of the electronic device 301.

In some example embodiments not shown, the first coupling region 344 may further include a fourth periphery connecting the first periphery 344A to the second periphery 344B and positioned in a fourth side, which is opposite to the third side, between the first side and the second side.

Meanwhile, the first coupling region 344 described herein is an example, and not limited to the illustrated shape, and may have various shapes based on a position, type, and/or radiation pattern of the antenna 397.

The second ground region 346 may include a second connector region 348 spaced apart from the first connector region 340 and connected to the ground end of the cable 332. In an example embodiment, the second connector region 348 may be positioned adjacent to at least one of the plurality of edges 313B and 313C defining the plurality of keyboard holes 313A. In some example embodiments, the second connector region 348 may be positioned adjacent to the outer edge 313B.

The second coupling region 350 may be connected to the second ground region 346. In an example embodiment, the second coupling region 350 may expand from the second ground region 346. In some example embodiments, the second coupling region 350 may expand from a region (e.g., the second connector region 348) of the second ground region 346 where energy is concentrated. In an example embodiment, the second coupling region 350 may be formed in a substantially quadrilateral shape. Meanwhile, the second coupling region 350 described herein is an example, and is not limited to the illustrated shape, and may have various shapes based on a position, type, and/or radiation pattern of the antenna 397 or various forms (e.g., a loop form) of a radiation current of the second coupling region 350.

In an example embodiment, the second coupling region 350 may be grounded on at least one (e.g., the outer edge 313B) of the plurality of edges 313B and 313C defining the plurality of keyboard holes 313A. In an example embodiment, the second coupling region 350 may be grounded on the keyboard support body 320.

In an example embodiment, the second coupling region 350 may be positioned on the at least one of the plurality of keyboard holes 313A and/or at least one of the plurality of edges 313B and 313C. By having the second coupling region 350 positioned on the keyboard holes 313A, each of the keyboard holes 313A may individually emit energy through current flow (e.g., counterclockwise flow along the edges of the keyboard holes 313A).

In an example embodiment, the electronic device 301 may include an antenna support structure 380 configured to support the antenna 397. The antenna support structure 380 may be positioned on the PCB 330. The antenna support structure 380 may protect the PCB 330, support stable contact between the PCB 330 and the housing 310, and/or maintain a shape of the cable 332 of the antenna.

Figure 3C:
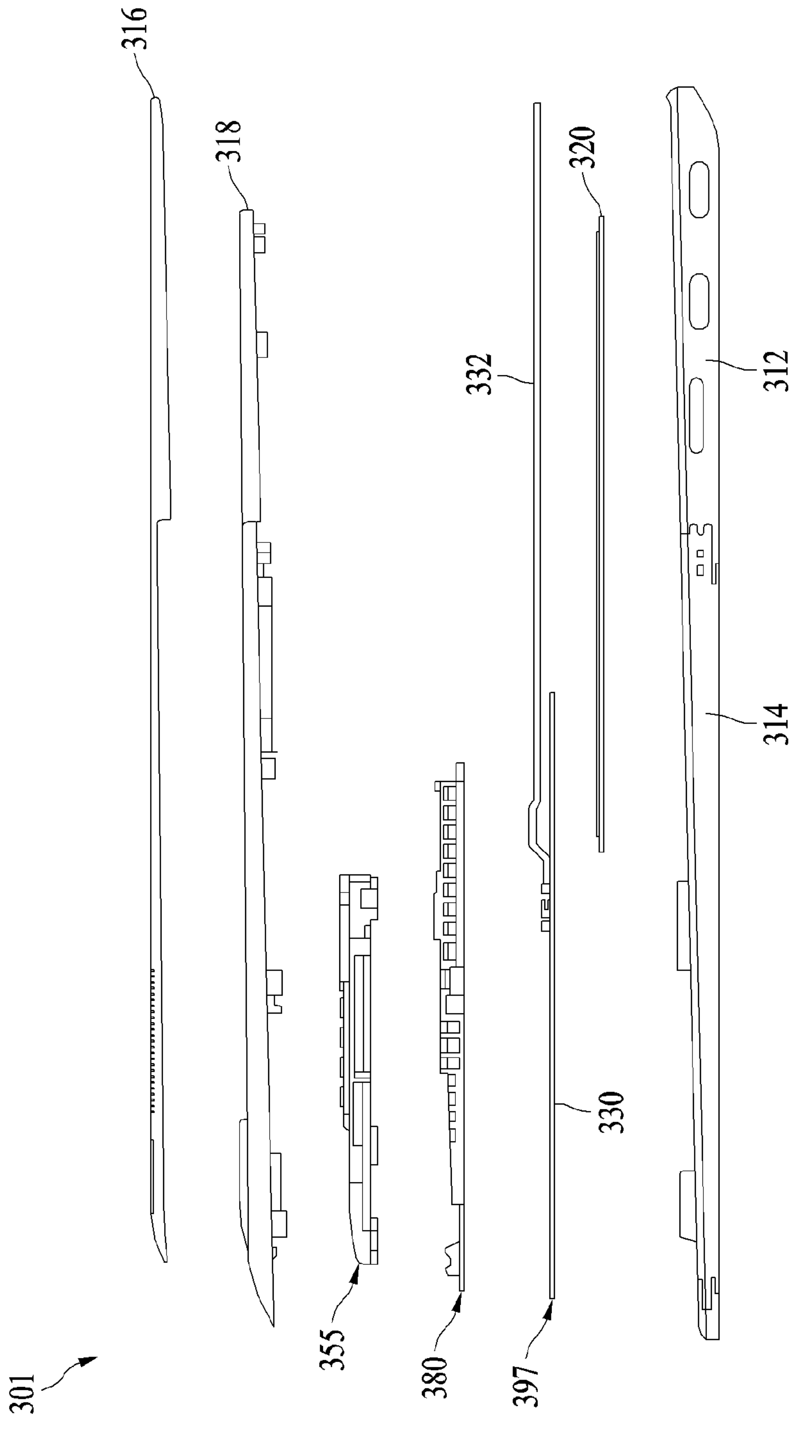
FIG. 3C is an exploded perspective view of an electronic device according to an example embodiment.
Figure 3D:
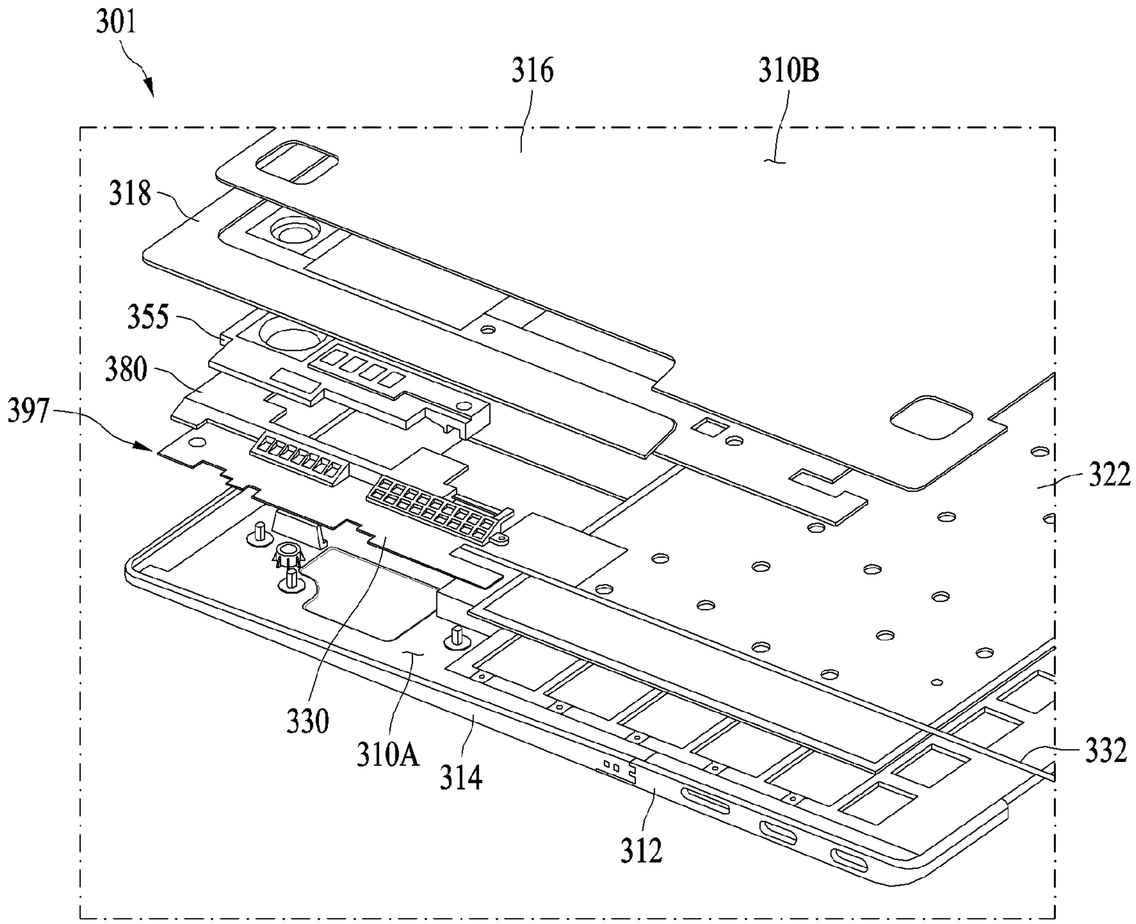
FIG. 3D is an exploded side view of an electronic device according to an example embodiment.
Figure 3E:
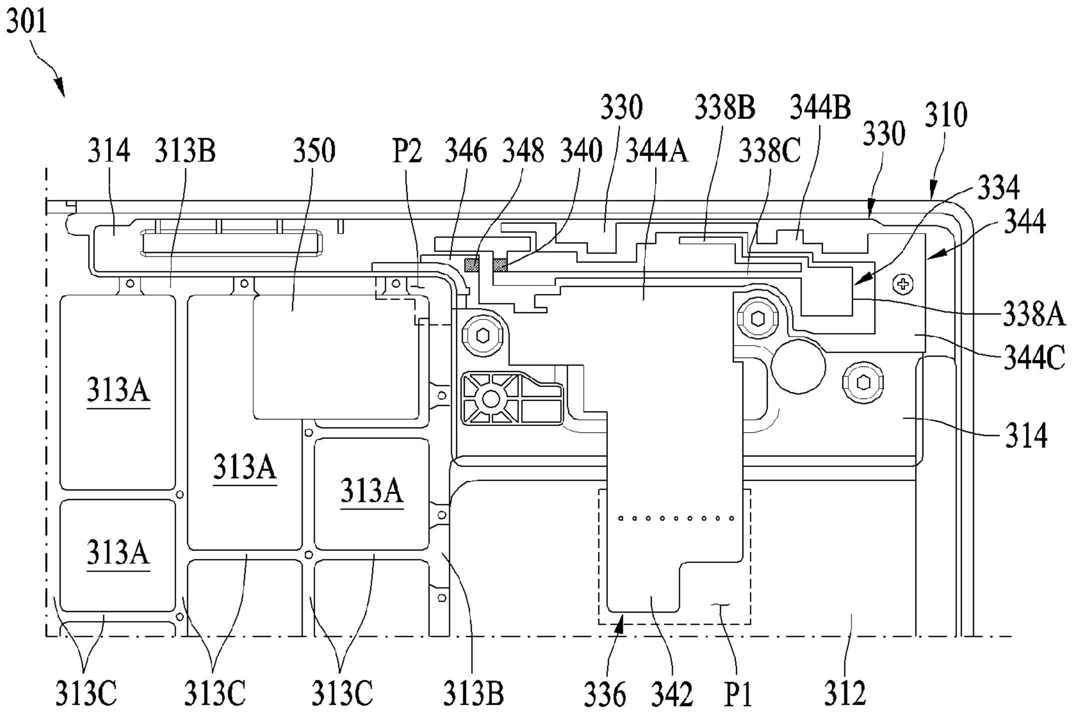
FIG. 3E is a diagram of an antenna in an electronic device according to an example embodiment.
Figure 4A:
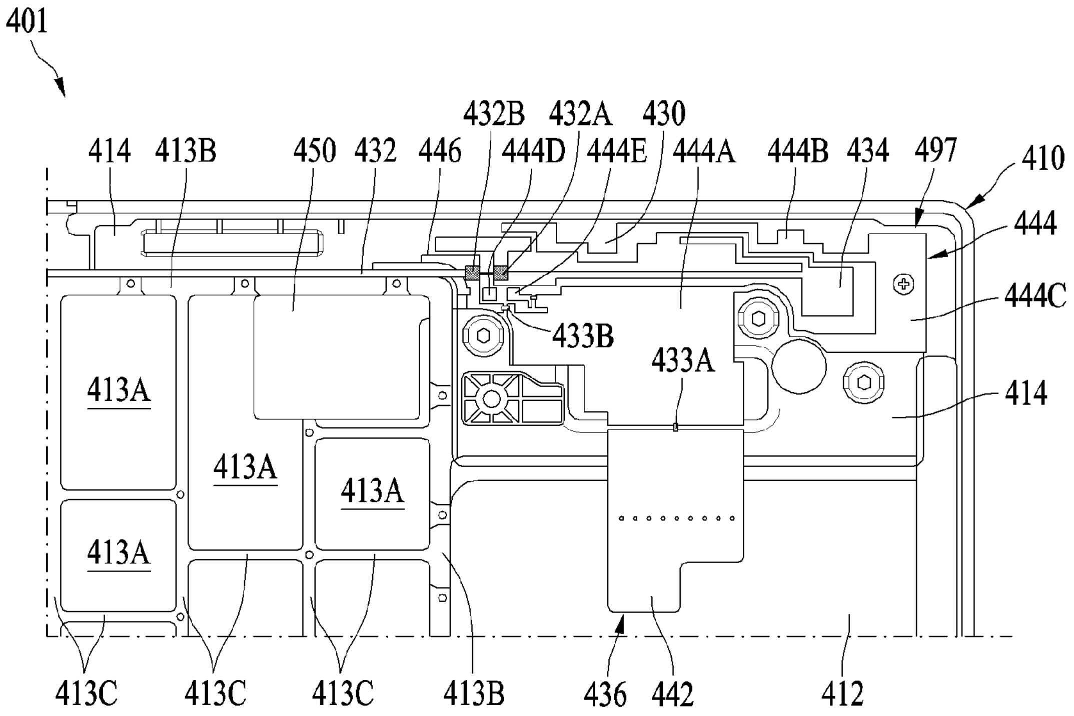
FIG. 4A is a diagram of an antenna in an electronic device according to an example embodiment.
Figure 4B:
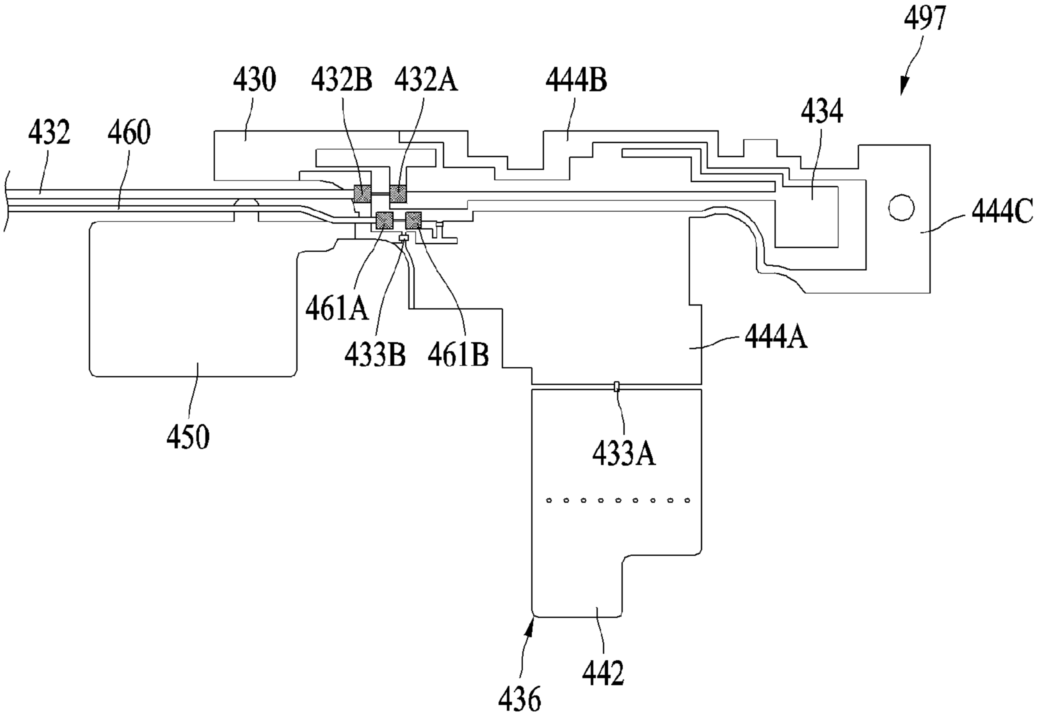
FIG. 4B is a diagram of an antenna and a sensor in an electronic device according to an example embodiment.

Referring to FIGS. 4A and 4B, an electronic device 401 (e.g., the electronic device 301 of FIGS. 3A to 3E) may include a housing 410 (e.g., the housing 310). The housing 410 may include a metal part 412 (e.g., the first metal part 312) and a non-metal part 414 (e.g., the first non-metal part 314). The metal part 412 may include a plurality of keyboard holes 413A (e.g., the keyboard hole 313A), and a plurality of edges 413B and 413C (e.g., an outer edge 413B and an inner edge 413C).

The electronic device 401 may include an antenna 497 (e.g., the antenna 397). The antenna 497 may include a PCB 430 (e.g., the PCB 330), and a cable 432 (e.g., the cable 332). The cable 432 may have a feed end 432A and a ground end 432B.

The PCB 430 may include a feed pattern 434 (e.g., the feed pattern 334) and a ground pattern 436 (e.g., the ground pattern 336). The feed pattern 434 may include a first connector region (e.g., the first connector region 340) to which the feed end 432A is connected. The ground pattern 436 may include a first ground region 442 (e.g., the first ground region 342), a first coupling region 444 (e.g., the first coupling region 344), a second ground region 446 (e.g., the second ground region 346), and a second coupling region 450 (e.g., the second coupling region 350). In an example embodiment, the first coupling region 444 may include a first periphery 444A, a second periphery 444B, and a third periphery 444C. The second ground region 446 may include a second connector region (e.g., the second connector region 348) to which the ground end 432B is connected.

In an example embodiment, the ground pattern 436 may include a first connection pad 444D and a second connection pad 444E to be electrically connected to an input of a grip sensor configured to detect permittivity of an object (e.g., a human body). In exemplary embodiments, the grip sensor is configured to detect if the electronic device 401 is being held by a human. For example, the first connection pad 444D may be connected to a first input end 461A of a grip sensor cable 460, and the second connection pad 444E may be connected to a second input end 461B of the grip sensor cable 460. The first connection pad 444D and the second connection pad 444E may be spaced apart from each other. The first connection pad 444D may be positioned between the feed pattern 434 and the second ground region 446, and the second connection pad 444E may be positioned between the feed pattern 434 and the first coupling region 444. The first connection pad 444D and the second connection pad 444E may be spaced apart from the first coupling region 444 and the second ground region 446.

In an example embodiment, the antenna 497 may include a first capacitor 433A configured to separate the first ground region 442 and the first coupling region 444 and a second capacitor 433B configured to separate the first coupling region 444 and the second ground 446. The first capacitor 433A and the second capacitor 433B may maintain an operation of the grip sensor, for example, when the first input end 461A and the second input end 461B of the grip sensor cable 460 are electrically connected to at least a portion of the ground pattern 436.

Figure 5:
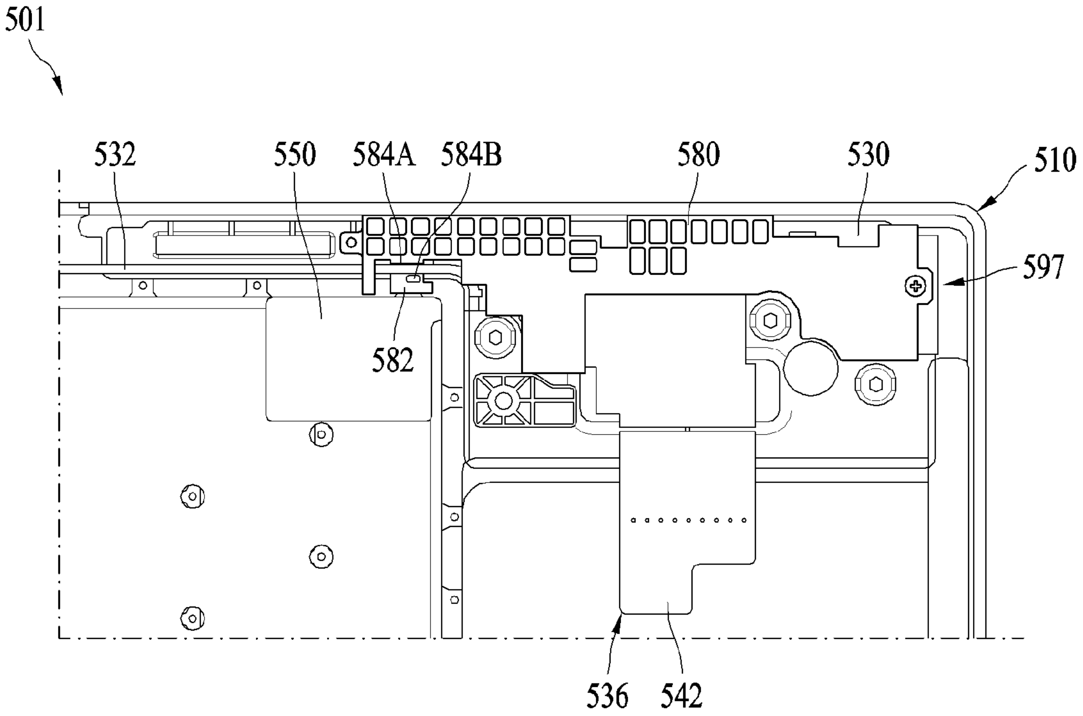
FIG. 5 is a diagram of an antenna support structure in an electronic device according to an example embodiment.

Referring to FIG. 5, an electronic device 501 (e.g., the electronic device 401 of FIG. 4A) may include a housing 510 (e.g., the housing 410), an antenna 597 (e.g., the antenna 497), and an antenna support structure 580 (e.g., the antenna support structure 380 of FIGS. 3C and 3D). The antenna 597 may include a PCB 530 (e.g., the PCB 430), and a cable 532 (e.g., the cable 432). The PCB 530 may include a feed pattern (e.g., the feed pattern 434) and a ground pattern 536 (e.g., the ground pattern 436). The ground pattern 536 may include a first ground region 542 (e.g., the first ground region 442), a first coupling region 544 (e.g., the first coupling region 444), a second ground region (e.g., the second ground region 446), and a second coupling region 550 (e.g., the second coupling region 450).

In an example embodiment, the antenna support structure 580 may be configured to protect at least a portion of the antenna 597. The antenna support structure 580 may, for example, substantially overlap the feed pattern.

In an example embodiment, the antenna support structure 580 may include a pressor 582 configured to press at least a portion of the antenna 597. The pressor 582 may, for example, provide stable contact between the second coupling region 550 and a partial region of the housing 510 (e.g., the first surface 310A of FIG. 3A).

In an example embodiment, the antenna support structure 580 may include at least one or more guides (e.g., first and second guides 584A and 584B) configured to maintain a shape of the cable 532. In some example embodiments, the at least one of the guides (e.g., the first and second guides 584A and 584B) may be positioned on the pressor 582. In some example embodiments, the antenna support structure 580 may include the first guide 584A supporting one side of the cable 532 and the second guide 584B supporting another side of the cable 532. The first guide 584A and the second guide 584B may form a groove capable of accommodating at least a portion of the cable 532 between the first guide 584A and the second guide 584B. The first guide 584A and the second guide 584B may protrude from the pressor 582, for example.

Figure 6:
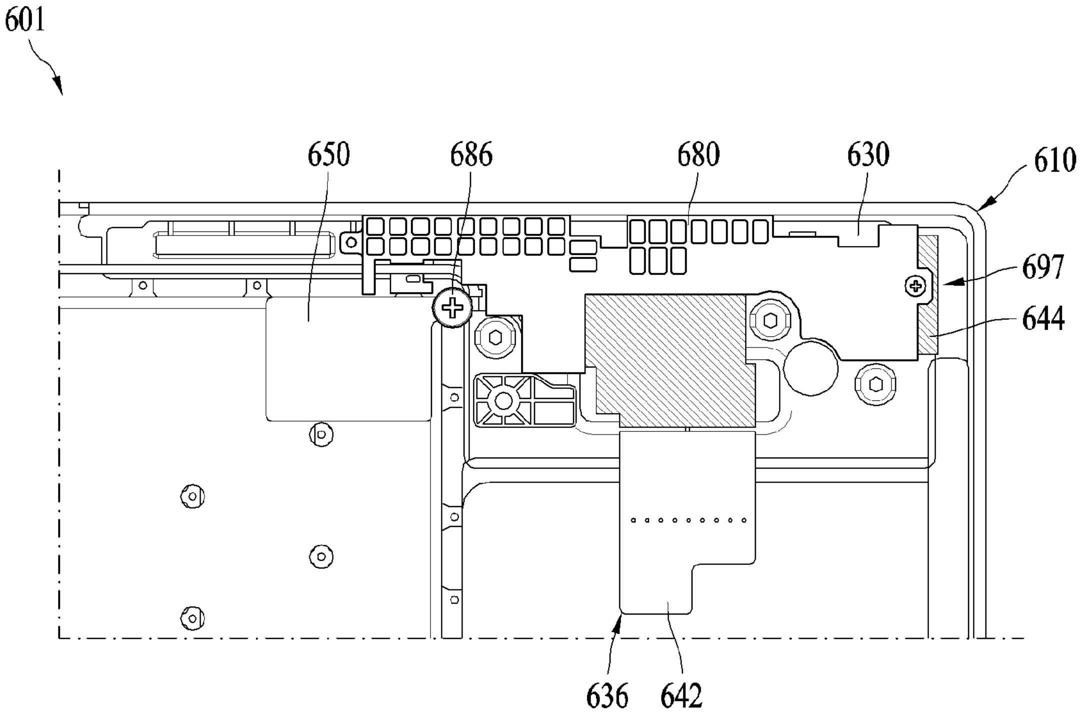
FIG. 6 is a diagram of an antenna in an electronic device according to an example embodiment.

Referring to FIG. 6, an electronic device 601 (e.g., the electronic device 401 of FIG. 4A) may include a housing 610 (e.g., the housing 410), an antenna 697 (e.g., the antenna 497), and an antenna support structure 680 (e.g., the antenna support structure 580 of FIG. 5). The antenna 697 may include a PCB 630 (e.g., the PCB 430). The PCB 630 may include a feed pattern (e.g., the feed pattern 434) and a ground pattern 636 (e.g., the ground pattern 436). The ground pattern 636 may include a first ground region 642 (e.g., the first ground region 442), a first coupling region 644 (e.g., the first coupling region 444), a second ground region (e.g., the second ground region 446), and a second coupling region 650 (e.g., the second coupling region 450).

In an example embodiment, the electronic device 601 may include a fastener 686 configured to fasten the second coupling region 650 to at least a portion (e.g., the first surface 310A of FIG. 3A) of the housing 610. The fastener 686 may include, for example, a screw. The fastener 686 may provide stable contact between the housing 610 and the second coupling region 650 and improve the assembly accuracy of the antenna 697 in the housing 610.

According to an embodiment, an electronic device 301 includes a housing 310 including a first surface 310A and a second surface 310B opposite to the first surface 310A, and an antenna 397 including PCB 330 positioned between the first surface 310A and the second surface 310B. The PCB 330 a ground pattern 336 including a first ground region 342 in contact with a feed pattern 334 including a first connector region 340 and a first portion P1 of the first surface 310A, a first coupling region 344 connected to the first ground region 342, a second ground region 346 connected to the first coupling region 344 and a second connector region 348, and a second coupling region 350 connected to the second ground region 346 and in contact with a second portion P2 different from the first portion P1 of the first surface 310A.

In an example embodiment, the first coupling region 344 may at least partially enclose the feed pattern 334.

In an example embodiment, the first coupling region 344 may include a first periphery 344A positioned in a first side of the feed pattern 334, a second periphery 344B positioned in a second side different from the first side of the feed pattern 334, and a third periphery 344C positioned in a third side between the first side and the second side of the feed pattern 334 and connecting the first periphery 344A to the second periphery 344B.

In an example embodiment, the second coupling region 350 may expand from the second ground region 346.

In an example embodiment, the first surface 310A may include a first part 314 of a non-metal material, and a second part 312 of a metal material formed of a single segment.

In an example embodiment, the feed pattern may be positioned on the first part 314.

In an example embodiment, the second part 312 may include a plurality of keyboard holes 313A and edges 313B and 313C forming the plurality of keyboard holes 313A. The second coupling region 350 may be grounded on at least one edge 313B of the edges 313B and 313C.

In an example embodiment, the first connector region 340 and the second connector region 348 may be positioned adjacent to the at least one edge 313B.

In an example embodiment, the electronic device 301 may further include a keyboard support body 320 positioned on the plurality of keyboard holes 313A.

In an example embodiment, the electronic device 301 may further include an insulator 322 positioned on the keyboard support body 320. The PCB 330 may be positioned on the insulator 322.

In an example embodiment, the electronic device 301 may further include a sound output module 355 positioned in the housing 310 so as not to substantially overlap the feed pattern 334.

In an example embodiment, the antenna 497 may further include a first capacitor 433A separating the first ground region 442 and the first coupling region 444, and a second capacitor 433B separating the first coupling region 444 and the second ground region 446.

In an example embodiment, an electronic device 401 may further comprise a grip sensor 460 cable having a first input end 461A connected to the first ground region 444 and a second input end 461B connected to the second ground region 446.

In an example embodiment, an electronic device 501 may further include an antenna support structure 580 positioned on a PCB 530 and configured to pressure the second coupling region 550. The antenna support structure 580 comprises a pressor configured to maintain contact between the second coupling region and the second portion of the first surface.

In an example embodiment, the antenna support structure 580 may further comprise at least one guide 584A and 584B configured to maintain a shape of a cable 532 connecting the PCB 530 and a communication module of the electronic device 501.

In an example embodiment, an electronic device 601 may further include a fastener 686 configured to fasten the second coupling region 650 to the first surface.

According to an embodiment, an antenna 397 includes a feed pattern 334 including a first connector region 340, and a ground pattern 336 including a first ground region 342, a first coupling region 344 connected to the first ground region 342, a second ground region 346 connected to the first coupling region 344 and including a second connector region 348, and a second coupling region 350 connected to the second ground region 346.

In an example embodiment, the first coupling region 344 may at least partially enclose the feed pattern 334.

In an example embodiment, the first coupling region 344 may include a first periphery 344A positioned in a first side of the feed pattern 334, a second periphery 344B positioned in a second side different from the first side of the feed pattern 334, and a third periphery 344C positioned in a third side between the first side and the second side of the feed pattern 334 and connecting the first periphery 344A to the second periphery 344B.

In an example embodiment, the second coupling region 350 may expand from the second ground region 346.

In an example embodiment, the antenna 497 may further include a first capacitor 433A separating the first ground region 442 and the first coupling region 444, and a second capacitor 433B separating the first coupling region 444 and the second ground region 446.

In an example embodiment, the antenna 397, 497, 597 and 697 has a bandwidth of a frequency band of about 1,000 MHz in a low-band frequency, about 2,300 MHz in a mid-band frequency, about 2,700 MHz in a high-band frequency, and about 4,300 MHz in an ultra-high-band frequency.

According to an embodiment, the electronic device 301 includes the housing 310 including the first surface 310A including a first part 314 of a non-metal material and a second part 312 of a metal material formed of a single segment and the second surface 310B opposite to the first surface 310A, and the antenna 397 including the PCB 330 positioned between the first surface 310A and the second surface 310B, wherein the PCB 330 includes a feed pattern 334 positioned on the first part 314, and the ground pattern 336 including the first ground region 342 in contact with the first portion P1 of the first surface 310A, the first coupling region 344 connected to the first ground region 342, the second ground region connected to the first coupling region 344 and including the second connector region 348, the second coupling region 350 connected to the second ground region 346 and in contact with the second portion P2 different from the first portion P1 of the first surface 310A.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a housing comprising a first surface and a second surface opposite to the first surface; and an antenna comprising a printed circuit board (PCB) positioned between the first surface and the second surface, wherein the PCB comprises:

a feed pattern comprising a first connector region; and a ground pattern comprising a first ground region in contact with a first portion of the first surface, a first coupling region connected to the first ground region, a second ground region connected to the first coupling region and comprising a second connector region, and a second coupling region connected to the second ground region and in contact with a second portion of the first surface, wherein the second portion of the first surface is different from the first portion of the first surface.

2. The electronic device of claim 1, wherein the first coupling region is configured to at least partially enclose the feed pattern.

3. The electronic device of claim 2, wherein the first coupling region comprises:

a first periphery positioned in a first side of the feed pattern;

a second periphery positioned in a second side of the feed pattern opposite to the first side of the feed pattern; and a third periphery positioned in a third side of the feed pattern between the first side and the second side of the feed pattern and configured to connect the first periphery to the second periphery.

4. The electronic device of claim 1, wherein the second coupling region expands from the second ground region.

5. The electronic device of claim 1, wherein the first surface comprises a first part made of a non-metal material and a second part made of a metal material.

6. The electronic device of claim 5, wherein the feed pattern is positioned on the first part.

7. The electronic device of claim 5, wherein the second part comprises a plurality of keyboard holes and edges forming the plurality of keyboard holes, and the second coupling region is grounded on at least one of the edges.

8. The electronic device of claim 7, wherein the first connector region and the second connector region are positioned adjacent to the at least one of the edges.

9. The electronic device of claim 7, further comprising:

a keyboard support body positioned on the plurality of keyboard holes.

10. The electronic device of claim 9, further comprising:

an insulator positioned on the keyboard support body, wherein the PCB is positioned on the insulator.

11. The electronic device of claim 1, further comprising:

a sound output module positioned in the housing so as not to substantially overlap the feed pattern.

12. The electronic device of claim 1, wherein the antenna further comprises:

a first capacitor separating the first ground region and the first coupling region; and a second capacitor separating the first coupling region and the second ground region.

13. The electronic device of claim 12, further comprising a grip sensor cable having a first input end connected to the first ground region and a second input end connected to the second ground region.

14. The electronic device of claim 1, further comprising:

an antenna support structure positioned on the PCB, the antenna support structure having a pressor configured to maintain contact between the second coupling region and the second portion of the first surface.

15. The electronic device of claim 14, wherein the antenna support structure further comprises at least one guide configured to maintain a shape of a cable connecting the PCB and a communication module of the electronic device.

16. The electronic device of claim 1, further comprising:

a fastener configured to fasten the second coupling region to the first surface.

17. An antenna, comprising:

a printed circuit board (PCB);

a feed pattern formed on the PCB and comprising a first connector region; and a ground pattern formed on the PCB and comprising a first ground region, a first coupling region connected to the first ground region, a second ground region connected to the first coupling region and comprising a second connector region, and a second coupling region connected to the second ground region, wherein the second coupling region expands from the second connector region of the second ground region and the second coupling region is configured to be electrically connected to a ground end of a cable, and wherein the second coupling region comprises a conductive pattern on the PCB configured to physically contact a metal portion of a device housing to provide a ground return.

18. The antenna of claim 17, wherein the first coupling region is configured to at least partially enclose the feed pattern.

19. The antenna of claim 18, further comprising:

a first capacitor separating the first ground region and the first coupling region; and a second capacitor separating the first coupling region and the second ground region.

20. The antenna of claim 17, wherein the first coupling region comprises:

a first periphery positioned in a first side of the feed pattern;

a second periphery positioned in a second side of the feed pattern opposite to the first side of the feed pattern; and a third periphery positioned in a third side of the feed pattern between the first side and the second side of the feed pattern and configured to connect the first periphery to the second periphery.

21. The antenna of claim 17, wherein the second coupling region expands from the second ground region.

22. The antenna of claim 17, wherein the antenna has a bandwidth of a frequency band of about 1,000 MHz in a low-band frequency, about 2,300 MHz in a mid-band frequency, about 2,700 MHz in a high-band frequency, and about 4,300 MHz in an ultra-high-band frequency.

23. An electronic device, comprising:

a housing comprising a first surface comprising a first part of a non-metal material and a second part of a metal material formed of a single segment, and a second surface opposite to the first surface; and an antenna comprising a printed circuit board (PCB) positioned between the first surface and the second surface, wherein the PCB comprises:

a feed pattern positioned on the first part; and a ground pattern comprising a first ground region in contact with a first portion of the first surface, a first coupling region connected to the first ground region, a second ground region connected to the first coupling region and comprising a second connector region, and a second coupling region connected to the second ground region and in contact with a second portion different from the first portion of the first surface.

* * * * *